United States Patent [19]

Bacher et al.

[11] Patent Number: 5,308,484
[45] Date of Patent: May 3, 1994

[54] FILTERING APPARATUS FOR SYNTHETIC THERMOPLASTICS MATERIAL

[76] Inventors: Helmut Bacher, Bruck/Hausleiten 17; Helmuth Schulz, Badstrasse 20, both of St. Florian A-4490; Georg Wendelin, Waldbothenweg 84, Linz A 4033; Gerhard Wendelin, Am Hartmayrgut 5, Linz-Urfahr A 4040, all of Austria

[21] Appl. No.: 972,460
[22] PCT Filed: Jul. 11, 1991
[86] PCT No.: PCT/AT91/00084
  § 371 Date: Jan. 19, 1993
  § 102(e) Date: Jan. 19, 1993
[87] PCT Pub. No.: WO92/01500
  PCT Pub. Date: Feb. 6, 1992

[30] Foreign Application Priority Data

Jul. 23, 1990 [AT] Austria .................. 1541/90

[51] Int. Cl.⁵ .................. B01D 29/01; B01D 39/12
[52] U.S. Cl. .................. 210/232; 210/333.01; 210/340; 210/411
[58] Field of Search .................. 210/132, 232, 332, 340, 210/91, 409, 411, 791, 333.01; 425/197, 199, 376.1, 378.1, 382.3

[56] References Cited

U.S. PATENT DOCUMENTS 4,332,541  6/1982  Anders .................. 210/409

FOREIGN PATENT DOCUMENTS 0205695  7/1986  European Pat. Off. .
0270501  5/1987  European Pat. Off. .
0314024  9/1988  European Pat. Off. .
3606138  4/1987  Fed. Rep. of Germany .

Primary Examiner—Frank Sever
Attorney, Agent, or Firm—Salter, Michaelson & Benson

[57] ABSTRACT

A filtration apparatus for thermoplastic synthetic plastics material comprises a housing (1) in which a carrier body (4) formed by a piston, for two screen nests (8,9) is bearingly supported for displacement in direction of its axis. In the filtration position the melt streams from a supply channel (2) via inflow channels (10 to 13) into distribution spaces (14,15) located in front of the screen nests (8,9), then through the screens and via outflow channels (18,19) into a discharge channel (3). Each distribution space (14,15) is subdivided by at least one wall (21) and into each of the so formed compartments terminates an inflow channel (10 to 13). By shifting in longitudinal direction, the carrier body (4) can be brought into different back washing positions per screen nest (8, 9), in which respectively all inflow channels are closed off with the exception of one inflow channel associated to the screen nest to be back washed, whereas that remaining inflow channel serves as discharge channel for the back washing melt carrying along the contaminations, which melt is fed to the collection space (16,17) of the screen nest (8 or 9) to be cleaned via a backflow channel (23) that extends entirely in the carrier body (4).

18 Claims, 4 Drawing Sheets

FILTERING APPARATUS FOR SYNTHETIC THERMOPLASTICS MATERIAL

The invention relates to a filtration apparatus for synthetic thermoplastics material, with a housing, in which at least one supply channel for the material to be filtered and at least one discharge channel for the filtered material are provided, and with at least one carrier body displaceably guided in the housing between a filtration position and a back wash position for a screen arrangement having at least two nests of screens, whereby in the filtration position, distribution spaces, arranged at the inflow sides of the nests of screens are joined by means of inflow flow channels to the supply channel or the supply channels and collection spaces arranged at the outflow side of the nests of screens are joined by way of outflow channels to the discharge channel or the discharge channels and, in the back wash position, filtrated material is fed from the collection space of a nest of screens via a back flow channel into the collection space of another nest of screens to be cleaned and the distribution space of this other nest of screen discharges the contaminations from the apparatus, whereas in this back wash position the outflow channel of this other nest of screens is closed off.

Such a filtration apparatus is known (EP-B 250 695). It has the advantage that, during the cleaning of the screen arrangements, the supply of melt to the machine, which follows on the filtration apparatus, mostly an extruder with a mould, connected thereto, is not interrupted, but—even if with reduced throughflow—further runs continuously so that also a considerable pressure increase in the flow channel ahead of the filtration apparatus is avoided. However, it is disadvantageous that a relatively long back flow channel is used, through which also no continuous flow takes place so that thereby a thermic damage of the synthetic plastics material (cracking) present therein is possible.

In a further known filtration arrangement of somewhat deviating construction (EP-A 314 024) four nests of screens are located in a carrier body, which is displaceable in longitudinal direction, which nests of screens are located in pairs in series in longitudinal direction of the carrier body. Also in this design it is disadvantageous that parts of the channel used for backwashing and disposed in the housing are filled in each production position with synthetic plastics melt but no flow takes place so that the danger of cracking exists.

The present invention has as object to further improve the known arrangement, in particular regarding the simplicity of the construction and regarding the increase of the quantity of the melt volume supplied to the screen to be cleaned, which is equivalent to an improvement of the intensity of backwashing and therewith a screen cleaning, however, in particular regarding shortening the back washing channel and avoiding synthetic plastics melt standing in it. The invention solves this task by the features that the back flow channel which is disposed fully in the carrier body, passes through a separation wall of the carrier body between the two nests of screens and directly joins the collection spaces of the nests of screens of that carrier body together.

In such a manner the melt used for the back flow, which is branched off from the melt flowing from the discharge channel in the collection space of the one nest of screens, merely is led in the carrier body to the collection space of the other nest of screens to be cleaned because the back flow channel, which can be formed by an aperture of the separation wall does not leave the carrier body, that is, this back flow channel does not lead also through the housing or via the outflow channel, as is the case in the design described initially. The avoidance of redirections of the melt flow used for back flow also causes better pressure relationships at the inflow side of the nest of screen subject to the back flow so that a better cleaning results, inasmuch the overall back flow current concentrates only on one screen surface, which, in comparison to the know designs, results in an increased flow speed through the screen to be backwashed and therewith has a better cleaning effect.

A further advantage as compared to the initially described known design is to be found therein that the filtration apparatus in accordance with the invention is also functional only with one single carrier body, whereas in the initially described known embodiment at least two carrier bodies are necessary. Obviously the embodiment in accordance to the invention is also applicable to arrangements with two or more carrier bodies. In an apparatus with two carrier bodies with respectively two nests of screens each in the embodiment in accordance with the invention ¾ of the screen surface remains in active through flow, in the known embodiment in the type mentioned initially only half of the screen surface. This means that, in comparison to the latter embodiment, there are smaller pressure differences between normal filtration position and back flow position. In similar manner the embodiment in accordance with the invention is applicable to arrangements in which one single carrier body, in particular a piston displaceable in longitudinal direction, carries two or more pairs of nests of screens, that is four or more nests of screens. Because in the design in accordance with the invention the length of the back flow channel can be designed to be very short and melt continuously flows through the back flow channel, a cracking of the synthetic plastics material in the back flow channel normally cannot occur.

A requirement, which always is necessary in the case of back flow filters, is a maximum back flow current through the filter to be cleaned for achieving good cleaning with only a small reduced overall through flow through the filtration apparatus. As is clear from the above, the invention already takes a step in this direction. However, the relationships can be further improved in accordance with a preferred embodiment of the invention. This improvement proceeds from the knowledge that back washing of partial filter surfaces fulfils the mentioned conditions even better. Proceeding from this knowledge a further development of the inventic 1 is therein that different back flow positions of the carrier body are provided for the back flow of different partial zones of the screen of the respective nest of screens, which partial zones are limited at least by a wall subdividing the distribution chamber of the respective nest of screen leading to the relative screen, in particular disposed perpendicularly to this screen. The number of these partial zones or the associated walls can be selected as desired, however, for reasons of clarity and for simplicity of construction it is advisable to have only two partial zones per screen. Hereby, according to a further development of the invention, a corresponding number of inflow channels is provided for each nest of screens corresponding to the number of its screen partial zones, of which channels respectively one terminates into the part of the distributor space allocated to the respective screen partial zone, whereby in the filtration position all of the inflow channels are in communication with the common supply channel, whereas in each back flow position respectively one of these inflow channels per nest of screens to be cleaned serves for discharging the contaminations whereas the remaining of these inflow channels are closed.

Further features and advantages of the present invention can be taken from the description of an examplative embodiment which is schematically shown in the drawings FIG. 1 shows the apparatus in the filtration position in section through the axis of the carrier body, the latter, however, being shown in side view;

Figure 1:
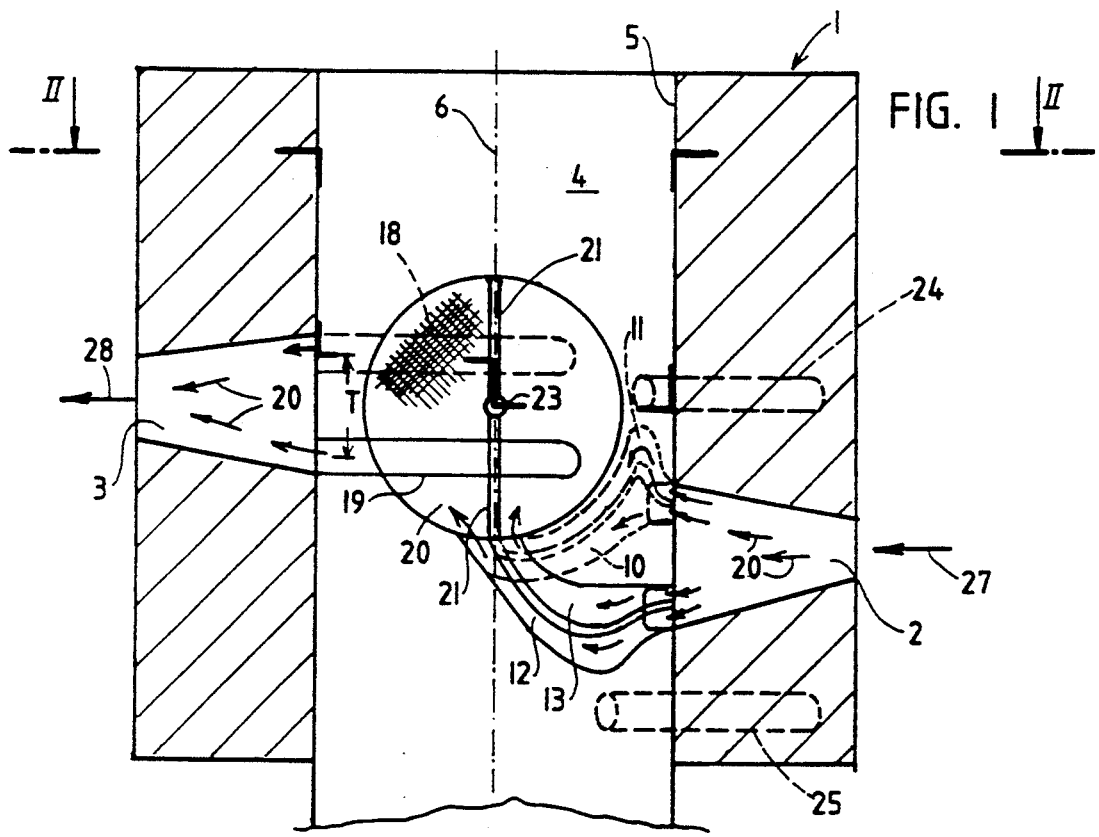

The apparatus has a housing 1, which has a supply channel 2 for the thermoplastic synthetic plastics material to be filtered and a discharge channel 3 for the filtrated material. On the path from the supply channel 2 to the discharge channel 3 the material flows through a carrier body 4 in the form of a rotational cylinder, which is longitudinally displaceable in a cylindrical bore 5 of the housing 1 in the direction of its axis (6). A screen arrangement 7 is embedded in the carrier body 4, which arrangement has two nests of screens 8,9 each of which consists of two perforated plates between which a filter insert for filtration of the plastics material is located. The material, which is to be filtrated, is supplied to the screen nests 8,9 in the filtration position of the apparatus (FIGS. 1,2) by means of inflow channels 10,11 or, respectively, 12,13, which terminate into distribution spaces 14 or 15 located ahead of the screen nests 8,9. Collection spaces 16, 17 for the melt, from which spaces the melt flows through the outflow channels 18 or 19 into the discharge channel 3 common to the two outflow channels in the direction of the arrows 20, are located behind the screen nests 8,9 seen in flow direction of the melt during the filtration procedure. The two inflow channels 10,11 or 12,13 of the two screen nests 8 or 9 are located on both sides of a central wall 21, which extends perpendicular to the surface of the screen of respective screen nests 8,9 and from this extends to the circumference of the carrier body 4, so that this wall 21 supports the associated screen by means of a perforated plate 31 during back flow, which wall is inserted together with the other constituents of the screen nests 8,9 into a recess 32 of the carrier body 4. The wall 21 sub-divides the associated distribution chamber 14 or 15 into two equal departments 14',14" or 15',15".

The two collection spaces 16,17 are separated from each other by means of a separation wall 22 extending transversely to the axis of the carrier body 4, through which a bore or an interruption passes centrally forming a back flow channel 23, which joins the two collection chambers 15,16.

The housing 1 further has two channels 24,25 on the side of the supply channel 2, of which respectively one serves for discharging contaminations removed during the back flow. These channels 24,25 can lead into a collection space for receiving these contaminations, which is not shown, or into the atmosphere.

The two outflow channels 18,19 are relatively staggered to each other for a small dividing dimension T (FIG. 1) in the direction of the axis 6. The distance T is dimensioned such that in the filtration position illustrated in the FIGS. 1 and 2 the openings of both outflow channels 18, 19 are covered by the inlet opening of the discharge channel 3. This is facilitated by a funnel shaped widening of the discharge channel 3 towards the two channels 18,19. The same distance T is found on the supply side, and thus the openings of the pair-arranged inflow channels 10,11 or 12,13 are similarly relatively displaced to each other in the direction of the axis 6. Also in this case the arrangement is such that the openings of these four inflow channels 10 to 13 at the wall of the carrier body 4 are fully covered by the funnel shaped widening opening of the supply channel 2 in the filtration position (FIGS. 1,2) so that the melt to be filtrated is supplied uniformly to all four divisions 14',14",15',15" of the distribution chambers 14,15. This melt flows through the two filters of the screen nests 8,9, is cleansed thereby and the cleaned melt flows through the outflow channels 18,19 into the discharge channel 3.

Figure 2:
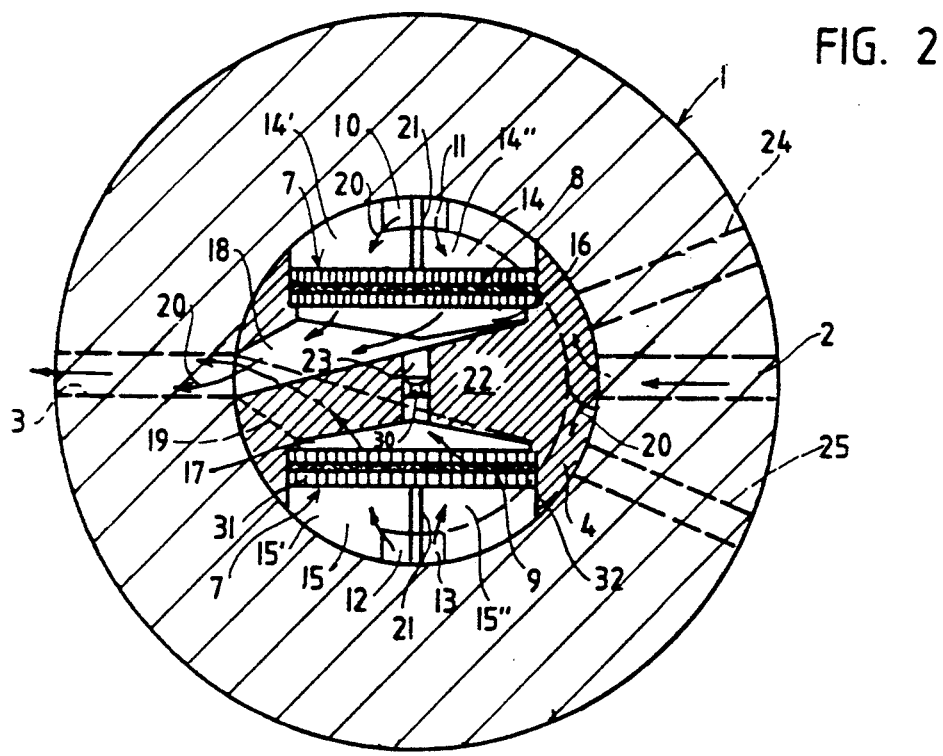
FIG. 2 shows the apparatus according to FIG. 1 in section seen along arrows II—II of FIG. 1.
Figure 3:
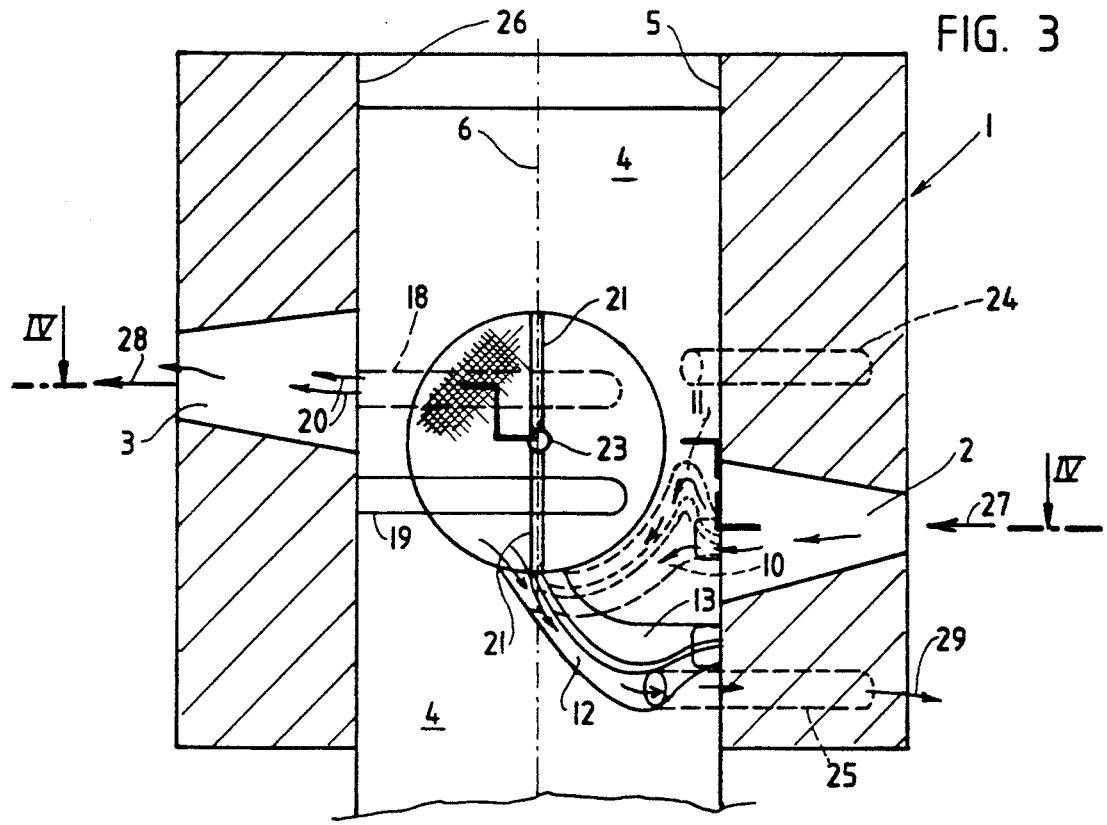
FIGS. 3 and 4 show sections similar to FIG. 1 or FIG. 2, but showing the apparatus in the back washing position for the left half of the nest of screens located below in FIG. 4.
Figure 4:
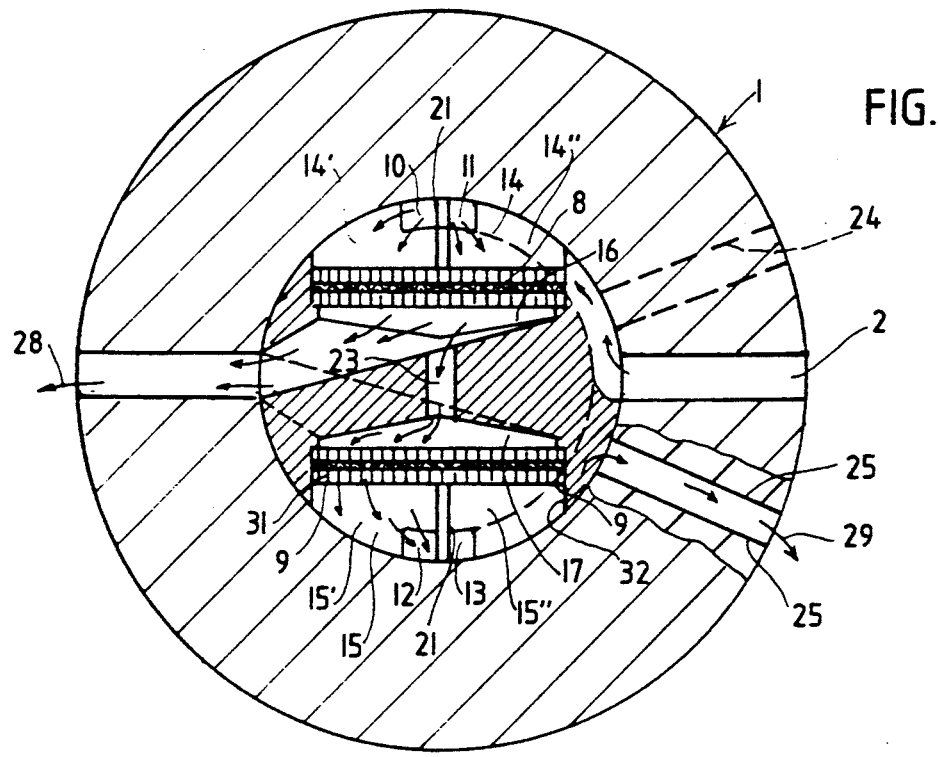
Figure 5:
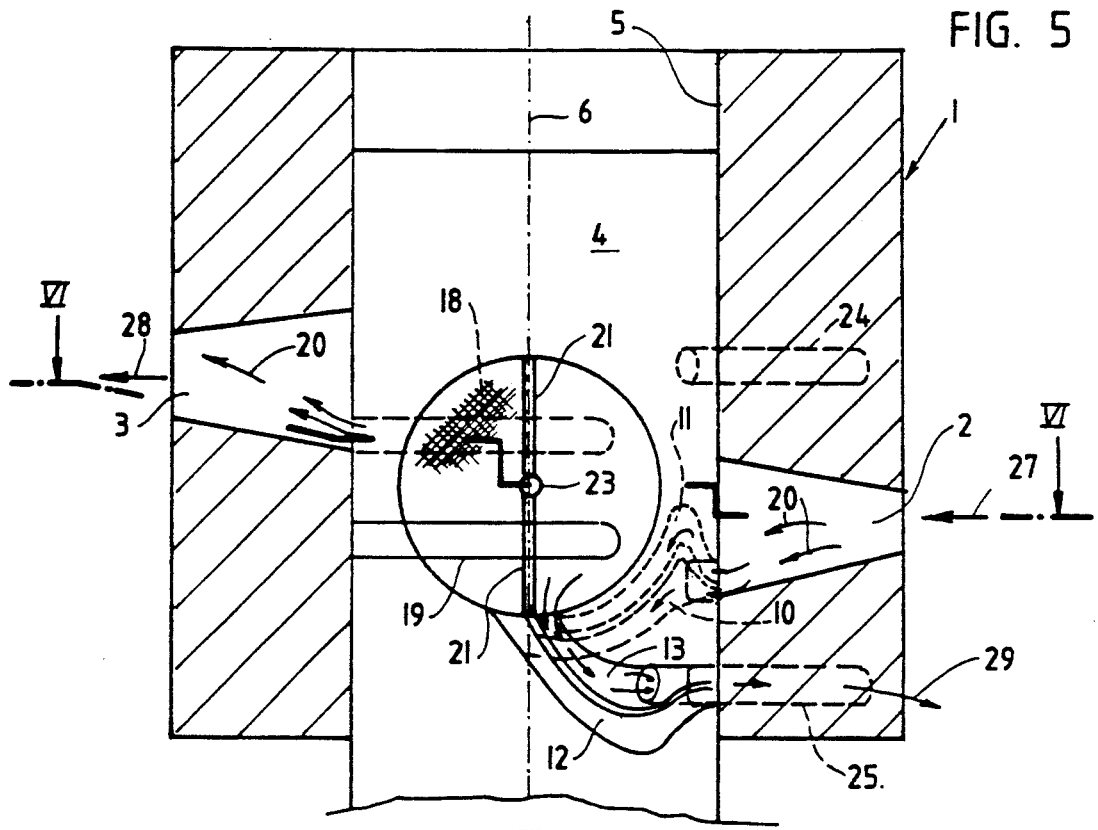
FIGS. 5 and 6 are sections similar to FIG. 3 or FIG. 4, but showing the apparatus in the back washing position for the right hand half of the nest of screens located below in FIG. 6.
Figure 6:
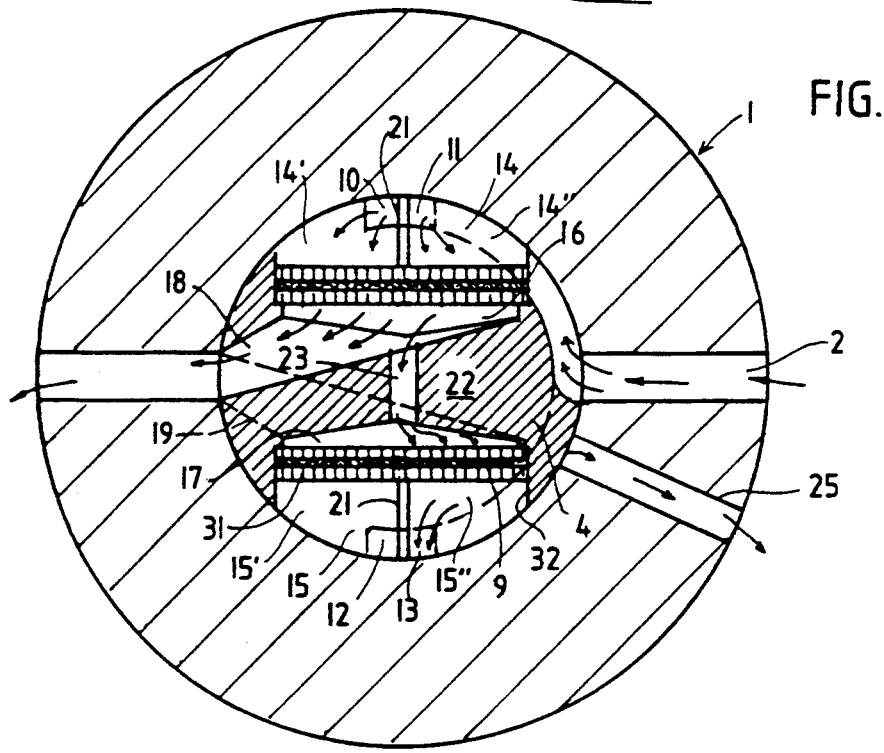

The carrier body 4 cannot be rotated around its axis 6, but can be displaced in the direction of this axis 6 as selected into one of four back washing positions of which two are illustrated in FIGS. 3,4 or 5,6 and this being that back washing position, in which the left half of the screen nest 9 is cleaned (FIGS. 3,4) and that, in which the right half of this screen nest 9 is cleaned (FIGS. 5,6). In the back washing position according to the FIGS. 3,4 the carrier body 4 is displaced so far to below from the filtration position illustrated in FIGS. 1,2 that, on the one hand, the outflow channel 19 is closed off by means of the inner wall 26 of the housing 1, along which the carrier body 4 is displaceably guided, and, on the other hand, the inflow channels 12,13. However, the inflow channel 12 is in communication with the channel 25 and therewith serves as discharge channel for contaminations from the left department 15' of the distribution chamber 15. Thus, the synthetic plastics melt to be cleaned supplied in the direction of the arrow 27 can enter from the supply channel 2 merely into the inflow channels 10,11 and flows from there in the arrow direction into the two departments 14', 14" of the distribution chamber 14. The melt supplied there passes through the screen of the screen nest 8, is cleaned thereby and partially flows via the outflow channel 18 into the discharge channel 3, from which it flows in the direction of the arrow 28 to the place of use, for example to a worm extruder with joined mould. The other part of the melt flows from the collection chamber 16 in arrow direction through the back flow channel 23 into the collection chamber 17 of the screen nest 9. Because the inflow channel 13 allocated to the right hand department 15" of the distribution chamber is closed off (see FIG. 3), the melt from the collection chamber 17 can enter only through the left half of the screen of the screen nest 9 into the distribution chamber 15. Therefore only the left half of the screen nest 9 is rinsed by the clean melt supplied from the back flow channel 23 and the contaminations settled in this screen half are loosened by this rinsing melt from the screen half, are taken along in arrow direction by means of the flowing melt and are led through the inflow channel 12, which now serves as outflow channel, into the channel 25, in which it is discharged in the direction of the arrow 29, for example to the mentioned collection chamber. As can be seen, in this cleaning procedure which is limited to the left half of the screen nest 9, the supply of melt to the discharge channel 3 joined onto the system is maintained and only a small pressure difference is created in the discharge channel 3 between the normal filtration position (FIGS. 1,2) and the back washing position (FIGS. 3,4). Because only one half of the screen nest 9 is rinsed, the clean melt flow supplied through the back flow channel 23 concentrates on this left screen half, so that a double flow velocity of the melt occurs through this screen half and therewith an improved cleaning effect.

Analogous relations exist if the right half of the screen nest 9 is to be backwashed. For this the carrier body 4 is displaced into the position illustrated in the FIGS. 5 and 6 in which—as in the case of the position according to FIGS. 3 and 4—the outflow channel 19 is closed off relative to the discharge channel 3 and also the inflow channels 12,13 are closed off relative to the supply channel 2. In contradistinction to the position according to FIGS. 3 and 4 in case of the back flow position according FIGS. 5 and 6 the inflow channel 13 is joined to the channel 15. The melt supplied to the consumption position flows, as is the case with the back washing position according to FIGS. 3 and 4, in arrow direction 27 through the supply channel 2 into the two inflow channels 10,11, from there into the two departments of the distribution chamber 14, passes through the screen nest 8 and flows through the outflow channel 18 into the discharge channel 3. In the collection chamber 16 a part of the cleaned melt which passed through the screen nest 8 is branched off and flows through the back flow channel 23 into the collection chamber 17 from where this melt can only arrive through the right half of the screen nest 9 in the right department 15" of the distribution chamber 15. The melt flowing through the right screen half at increased speed takes along the contaminations in the inflow channel 13, from where the contaminations are discharged via the channel 25 in the direction of the arrow 29.

The relationships for backwashing of the upper screen nest 8 are analogous to the above described back washing positions according to the FIGS. 3,4 or 5,6: For backwashing of the half of the screen nest 8 located in FIG. 2 on the left, merely the carrier body 4 for the screen arrangement 7 has to be displaced such that the outflow channel 19 is in communication with the discharge channel 3, but not the outflow channel 18. Furthermore the two inflow channels 12,13 have to be in communication with the supply channel 2 and the inflow channel 10 with the channel 24. The melt used for cleaning the left screen half flows then from the supply channel 2 through the two inflow channels 12,13 into the distribution chamber 15, and through the screen nest 9 into the collection chamber 17 where a part of the melt flows to the discharge channel 3. The other part of the cleaned melt passes through the back flow channel 23 into the collection chamber 16 of the screen nest 8, flows through its left half, cleans it hereby and carries the contaminations taken along by the melt through the inflow channel 10 into the channel 24.

The relationships for cleaning of the left half of the screen nest 8 are analogous, merely the inflow channel 11 is to be brought into communication with the channel 24.

As can be seen, the carrier body 4 is displaceable into different positions, but for this need not be displaceable in longitudinal direction. It is possible to achieve the described switching on or switching off of the individual channels also by means of turning the carrier body 4 around its axis 6.

As can be seen, the two screen nests 8, 9 are inserted in corresponding recesses of the carrier body 4 with parallel screen surfaces to each other. This forms a clear, easily producible arrangement and simplifies assembly and deassembly. However, for achieving particular flow relationships it would be possible to embed the two screen nests 8,9 substantially in V-shaped arrangement in the carrier body 4, and also more than two screen nests can be provided. Also, each screen nest can be subdivided into two partial zones for back washing wherefore merely the arrangement of the walls 21 and the channels 10 to 13 are correspondingly to be multiplied. The use of departments of equal size, into which the distribution chambers are sub-divided, is recommended for reasons of uniformity, in particular regarding the through flow from the discharge channel 3, but is not absolutely essential.

The relationship of the melt streams, which flow during the back-washing operation from the respective collection chamber into the discharge channel 3 or into the back flow channel 23, or back flow stream, to the overall stream flowing through the apparatus is substantially determined by the channel cross section. It can be influenced or controlled by insertion of different throttle bodies into these channels, in particular into the back flow channel 23 by means of corresponding through flow resistances. An exchangeable throttle member 30 formed as throttle nozzle is schematically indicated in FIG. 2. Similarly such a throttle member can be adjustable regarding its through flow cross section.

Figure 7:
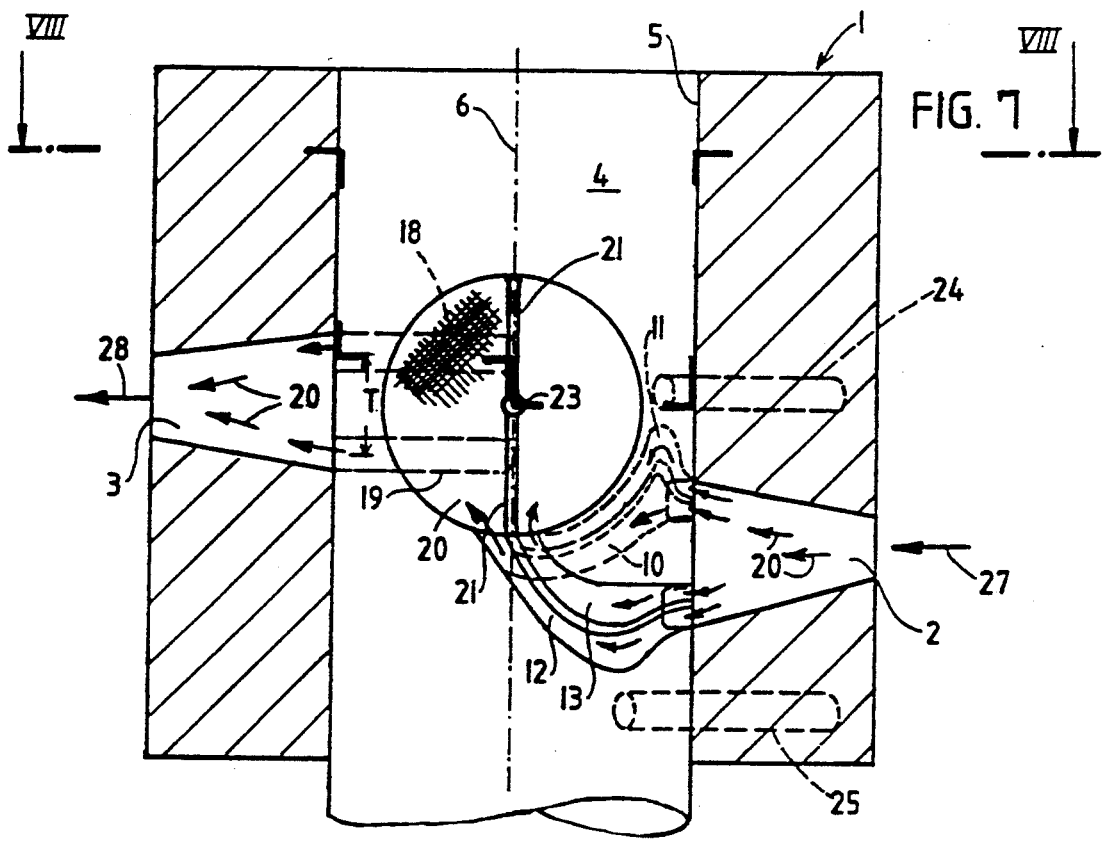
FIGS. 7 and 8 show sections similar to FIG. 1 or 2, but showing a variation of the central separation wall between the two nests of screens.
Figure 8:
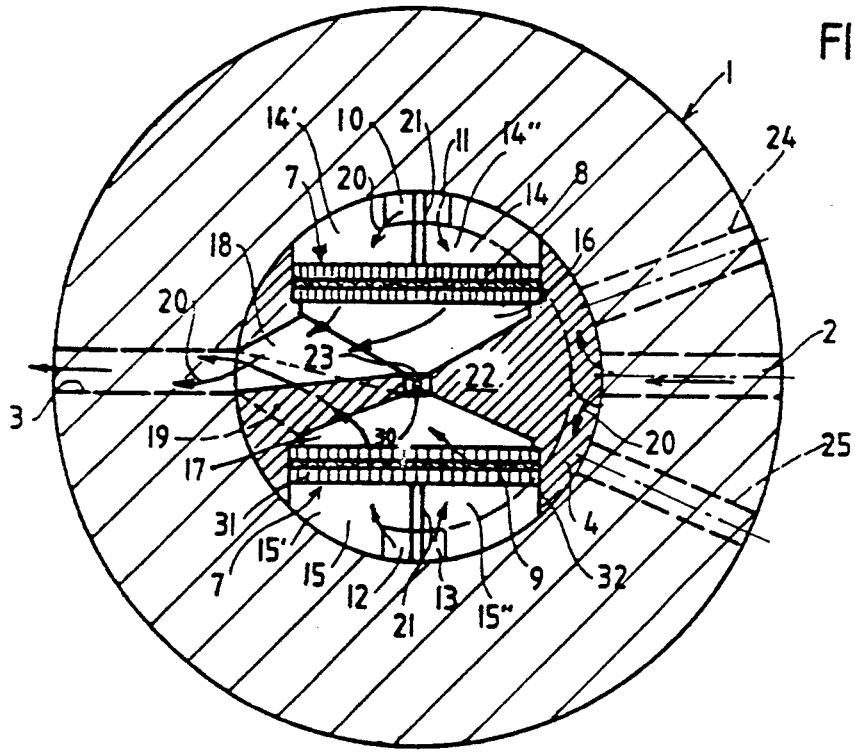

The variation of an embodiment illustrated in FIGS. 7 and 8 is distinguished from the previously described embodiment form merely thereby that the separation wall 22, which is located between the two collection chambers 16,17 is formed thinner, in particular in the central section of the separation wall. Thereby result, on the one hand, even more favourable flow relationships for the plastics melt, on the hand the length of the back flow channel 23 is limited to a minimum. This back flow channel 23 then need only be so long as is necessary for secure holding of the throttle member 30. The short length of the back flow channel 23 simplifies also the assembly of the throttle member 30 as well its reachability for replacement or cleaning.

The examples of embodiments illustrated in the drawing are illustrated for sake of simplicity with respectively one single supply flow channel 2 or discharge channel 3. In practice it mostly is more favourable to provide more than one supply channel 2 or discharge channel 3, whereby merely the mentioned connection relationships must be maintained.

I claim:

1. Apparatus for filtering thermoplastic synthetic plastics comprising:
    a housing having at least one supply channel for material to be filtered and at least one discharge channel for filtered material;

a carrier body including a screen arrangement having at least two screen nests, said carrier body further including a separation wall between said screen nests, a distribution space disposed at an inflow side of each screen nest, a collection space disposed at an outflow side of each screen nest, and a backwashing channel which directly joins the collection spaces of said screen nests, said backwashing channel passing through said separation wall between said screen nests, said carrier body being displaceably guided in said housing for movement between a filtration position and a different backwashing position for each of said screen nests, said distribution spaces being joined to said supply channel by inflow channels and said collection spaces being joined to said discharge channel by outflow channels when said carrier body is in said filtration position, said filtered material being supplied from the collection space of one screen nest to the collection space of another screen nest by said backwashing channel, said distribution space of said other screen nest discharging said contaminants from said apparatus, and said outflow channel of said other screen nest being closed when said carrier body is in one of said backwashing positions.

2. In the apparatus of claim 1, each screen nest including a screen and a plurality of partial zones of said screen, said partial zones being confined by at least one wall which divides the distribution space of the respective screen nest, said wall leading to the screen of the respective screen nest, said carrier body being displaceably guided into different backwashing positions for backwashing each of said partial zones of said screen of said screen nest to be backwashed.

3. In the apparatus of claim 2, said at least one wall extending perpendicularly to a surface of the screen of the screen nest.

4. In the apparatus of claim 2, said carrier including a plurality of inflow channels which correspond to the number of partial screens, one of said inflow channels leading into a section of the respective distribution space associated with the respective screen partial zone, said plurality of inflow channels being in communication with said supply channel when said respective screen nest is in said filtration position, one of said inflow channels of said respective screen nest serving for discharge of contaminants and the remainder of said inflow channels of said respective screen nest being closed for each backwashing position of said respective screen nest.

5. In the apparatus of claim 2, said housing including a contaminant discharge channel for each of said screen nests wherein in each backwashing position, one of said contaminant discharge channels is respectively joined with one inflow channel and the other contaminant discharge channels are closed off.

6. In the apparatus of claim 2, said carrier body comprising a piston having an axis, said piston being displaceably positioned in a longitudinal direction in said housing, said piston having at least two screen nests located on opposite sides of said axis, each screen nest having an outflow channel and at least two inflow channels which lead into at least two divisions of the distribution space associated with the respective screen nest, neighboring divisions being separated from each other by a wall, said inflow channels extending from places on said piston circumference which are offset in axial directions relative to each other, whereby in the filtration position the openings of the inflow channels are covered by the supply channel and the openings of the outflow channels are covered by the discharge channel.

7. In the apparatus of claim 6, said divisions of said distribution space being substantially similarly large.

8. The apparatus of claim 6, wherein the openings of the inflow channels are displaced in the axial direction of the piston to the same extent as the openings of the outflow channels.

9. The apparatus of claim 1 wherein the screen nests have screen surfaces which are parallel to each other.

10. The apparatus of claim 1 wherein two carrier bodies, each including two screen nests, are disposed in a common housing.

11. The apparatus of claim 1 comprising a single carrier body which includes at least three screen nests.

12. The apparatus of claim 11 wherein the carrier body includes four screen nests.

13. The apparatus of claim 1 wherein a throttle member is inserted into the flow of material in the backwashing position of the carrier body.

14. In the apparatus of claim 13, said throttle member being adjustable.

15. In the apparatus of claim 13, said throttle member comprising an adjustable throttle nozzle.

16. In the apparatus of claim 13, said throttle member comprising an exchangeable throttle nozzle.

17. In the apparatus of claim 13, said throttle member being positioned in said backwashing channel.

18. In the apparatus of claim 13, said throttle member being positioned in the contaminant discharge channel.

* * * * *